United States Patent
Minechika

(10) Patent No.: US 7,193,951 B2
(45) Date of Patent: Mar. 20, 2007

(54) DISK DEVICE AND METHOD FOR CONTROLLING THRESHOLD VALUE OF DISC DEVICE

(75) Inventor: Shigekazu Minechika, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 647 days.

(21) Appl. No.: 10/432,631

(22) PCT Filed: Nov. 21, 2001

(86) PCT No.: PCT/JP01/10190

§ 371 (c)(1),
(2), (4) Date: Jun. 9, 2003

(87) PCT Pub. No.: WO02/49017

PCT Pub. Date: Jun. 20, 2002

(65) Prior Publication Data

US 2004/0032810 A1    Feb. 19, 2004

(30) Foreign Application Priority Data

Dec. 11, 2000   (JP) ............................. 2000-375691

(51) Int. Cl.
    *G11B 7/00*    (2006.01)
(52) U.S. Cl. ................. 369/59.18; 369/59.19
(58) Field of Classification Search ............ 369/59.18
    See application file for complete search history.

(56) References Cited

U.S. PATENT DOCUMENTS 5,570,330 A    10/1996  Okawa
6,091,678 A *  7/2000  Fushimi et al. ......... 369/44.26
6,115,350 A *  9/2000  Furuta et al. ........... 369/47.53
6,614,740 B1 * 9/2003  Park et al. ............. 369/59.17

FOREIGN PATENT DOCUMENTS

| JP | 10-144002  | 5/1998  |
| JP | 11-53738   | 2/1999  |
| JP | 2001-357620 | 12/2001 |

* cited by examiner

Primary Examiner—Andrea Wellington
Assistant Examiner—Lixi Chow
(74) Attorney, Agent, or Firm—Westerman, Hattori, Daniels & Adrian, LLP.

(57) ABSTRACT

A disk apparatus (10) includes a spindle (62) to which a magnetooptical disk (60) is attached. An FCM is formed on the magnetooptical disk (60) along a track at intervals of a predetermined period, a laser beam having a different light amount depending on a time of an execution and an interruption of a recording process is incident upon the track. The FCM signal detection circuit (36) detects an FCM signal based on the laser beam reflected from the track, a comparator (42) compares a level of the FCM signal and a slice level, and a PLL circuit (54) generates a clock signal based on a comparison result by the comparator (42). When a change request between an execution/interruption of the recording process is applied, a predetermined first slice level is set to the comparator (42) until 200 mili seconds passes since a reception of the change request. When 200 mili seconds passes, a second slice level calculated based on a peak level of the FCM signal is set to the comparator (42).

13 Claims, 15 Drawing Sheets

DISK DEVICE AND METHOD FOR CONTROLLING THRESHOLD VALUE OF DISC DEVICE

TECHNICAL FIELD

The present invention relates to a disk apparatus. More specifically, the present invention relates to a disk apparatus which rotates a disk recording medium formed with an emboss mark along a track in a predetermined period, and radiates onto the track a laser beam having a different light amount depending on a time of an execution and an interruption of a recording process, and detects an emboss mark signal associated with the emboss mark based on the laser beam reflected from the track.

PRIOR ART

In a magnetooptical disk such as an ASMO(Advanced storage Magneto Optical disk), an FCM (Fine Clock Mark) is formed in each predetermined period along a track. Thus, a level of the FCM signal, which is detected when a laser beam traces the FCM, is compared with a slice level (threshold value), and a clock signal is generated in a PLL system based on this comparison signal, then it becomes possible to easily control a rotation speed of a spindle motor, and a processing speed of an ECC decoder.

However, an optimum laser power set to a semiconductor laser is different depending on a time of an execution and an interruption of a recording process, and an amplitude of the FCM signal is also different depending on a time of the execution and the interruption of the recording process. As a result, the amplitude of the FCM signal changes as shown in FIG. 21(A) when changed from the interruption of the recording process to the execution thereof, and changes as shown in FIG. 22(A) when changed from the execution of the recording process to the interruption thereof. At this time, unless the slice level is changed promptly, a noise appears to a comparison signal as shown in FIG. 21(B), and a portion of the comparison signal is lacked as shown in FIG. 22(B). Thereby, it becomes probable that a period of the clock signal is changed.

It is noted that the noise appearing in the comparison signal attributes to an address mark signal leaked in the FCM signal. In addition, in an FAT (File Allocation Table) system, and a UDF (Universal Disk Format) system, a vacant area is sporadically distributed on a recording surface as a result of repeated recordings/deletions, and a recording of the signal is intermittently performed toward each vacant area. This results in the above-described execution/interruption of the recording process being performed frequently until the recording of the signal of a desired size completes.

SUMMARY OF THE INVENTION

Therefore, it is a primary object of the present invention to provide a novel disk apparatus.

It is another object of the present invention to provide a disk apparatus capable of exactly generating a clock signal even at a time of a change of an execution/interruption of a recording process.

It is still another object of the present invention to provide a threshold control method of a disk apparatus capable of exactly generating a clock signal even at a time of a change of an execution/interruption of a recording process.

According to the present invention, a disk apparatus which rotates a disk recording medium formed with an emboss mark along a track in a predetermined period, and radiates onto the track a laser beam having a different light amount depending on a time of an execution and an interruption of a recording process, and detects an emboss mark signal associated with the emboss mark based on the laser beam reflected from the track, comprises: a generating means for generating a clock signal based on a comparison result between a of level of the first emboss mark signal and a threshold value; a receiving means for receiving a change request between an execution/interruption of the recording process; a first determining means for determining a first equation as the threshold value from a reception of the change request until a passing of a predetermined time period; and a second determining means for determining a second equation associated with a peak level of the first emboss mark signal as the threshold value after the predetermined time period passed.

The disk recording medium is formed with the first emboss mark along the track in a predetermined period. When such the disk recording medium rotates, the laser beam having a different light amount depending on a time of an execution and an interruption of a recording process is radiated onto the track, thereby detecting the emboss mark signal associated with the emboss mark based on the laser beam reflected from the track. The clock signal is generated by the generating means based on the comparison result between a level of the first emboss mark signal and a threshold value. When the change request between an execution/interruption of the recording process is received by the receiving means, the first equation is determined as the threshold value from a reception of the change request until a passing of a predetermined time period. When the predetermined time period passes, the second equation associated with a peak level of the first emboss mark signal is determined as the threshold value.

Thus, the first equation is to be determined as the threshold value from a reception of the change request between an execution/interruption of the recording process until a passing of a predetermined period is determined, thus it is possible to exactly generate the clock signal even when the second threshold value does not change promptly at a time of a change between the execution/interruption.

In a certain aspect of the present invention, a first peak level of the first emboss mark signal obtained by radiating a laser beam of a first light amount is detected, and a second peak level of the first emboss mark signal obtained by radiating a laser beam of a second light amount is detected. At this time, the first equation is calculated based on the first light amount, the second light amount, the first peak level, the second peak level, and a light amount of the laser beam after receiving the change request.

In another aspect of the present invention, the first emboss mark signal is a signal that changes toward a plus side and a minus side in reference to a median level. At this time, in the generating means, a timing that a level of the first emboss mark signal moves from one side, which is one of the plus side and the minus side, to the other side is detected, and a portion of a timing detection signal is extracted based on the comparison result. Then, the clock signal is produced based on the extracted timing detection signal.

It is noted that preferably, the timing detection signal to be extracted is a timing detection signal firstly obtained immediately after a level of the first emboss mark signal moves to the median level side than the threshold value.

Preferably, the disk recording medium is intermittently formed with a second emboss mark along the track.

Preferably, the disk recording medium is sporadically formed with a plurality of vacant areas.

According to the present invention, a threshold value control method of a disk apparatus which rotates a disk recording medium formed with an emboss mark along a track in a predetermined period, and a laser beam having a different light amount depending on a time of an execution and an interruption of a recording process, detects an emboss mark signal associated with the emboss mark based on the laser beam reflected from the track, and generates a clock signal based on a comparison result between a level and a threshold value of the emboss mark signal, comprises steps of: (a) determining a first equation as the threshold value from a reception of a change request between an execution/interruption of the recording process until a passing of a predetermined time period; and (b) determining a second equation, which renders associated with a peak level of the first emboss mark signal as the threshold value after the predetermined time period passed.

Upon receipt of the change request between the execution/interruption of the recording process, the first equation is determined as the threshold value from the reception until the predetermined period passes. When the predetermined time period passes, the second equation associated with the peak level of the first emboss mark signal is determined as the threshold value. Thus, it is possible to exactly generate the clock signal even when the second threshold value does not change promptly at a time of the change between the execution/interruption.

In a certain aspect of the present invention, the first threshold value is determined as follow. Firstly, a first peak level of the emboss mark signal is detected by radiating a laser beam of a first light amount, and a second peak level of the emboss mark signal is detected by radiating a laser beam of a second light amount. Then, the first numeral is calculated based on the first light amount, the second light amount, the first peak level, the second peak level, and a light amount of the laser beam after receiving the change request.

The above described objects and other objects, features, aspects and advantages of the present invention will become more apparent from the following detailed description of the present invention when taken in conjunction with the accompanying drawings.

BEST MODE FOR PRACTICING THE INVENTION

Figure 1:
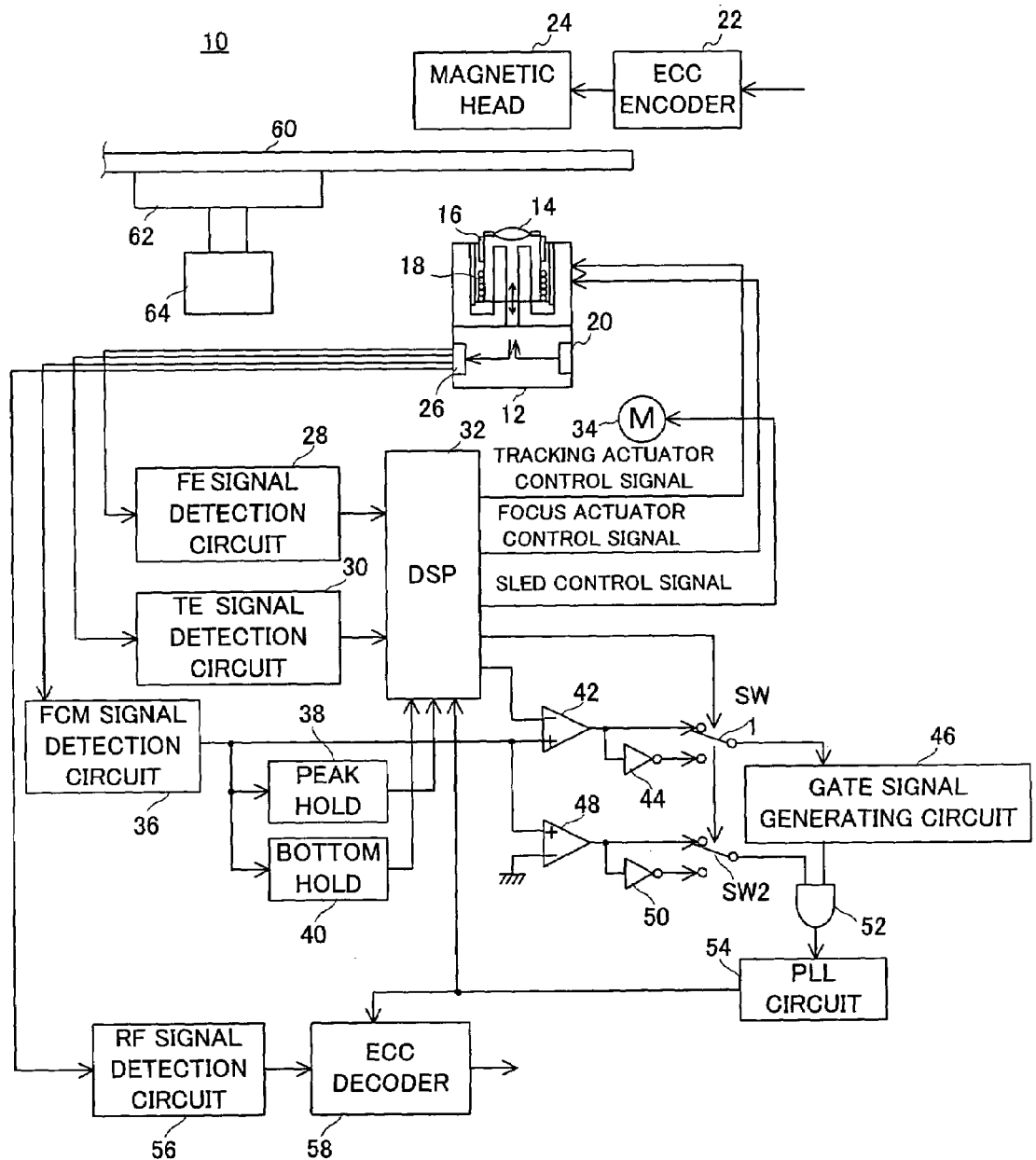
FIG. 1 is a block diagram showing one embodiment of the present invention.

Referring to FIG. 1, an optical disk apparatus 10 of this embodiment includes an optical pick-up 12 formed with an optical lens 14. The optical lens 14 is supported by a tracking actuator 16 and a focus actuator 18. A laser beam radiated from a laser diode 20 is converged by the optical lens 14, and then incident upon a recording surface of a magnetooptical disk 60 such as an ASMO. At a time of recording, a pulse-modulated laser beam is radiated from the laser diode 20, and at a time of reproducing, a laser beam on which a high frequency is superimposed is radiated from the laser diode 20. In addition, at a time of the recording, a recording signal output from an ECC encoder 22 is applied to a magnetic head 24, and a magnetic field is put on the magnetooptical disk 60 by the magnetic head 42.

It is noted that the magnetooptical disk 60 is chucked to a spindle 62, and rotated by a spindle motor 64. A speed of rotation of the spindle motor 64 is decreased in proportion to the optical pick-up 12 moving from an inner circle to an outer circle. Furthermore, the disk apparatus 10 of this embodiment adopts an FAT system or a UDF system, and a signal output from the ECC encoder 22 is intermittently recorded in a vacant area sporadically formed on the recording surface.

Figure 2:
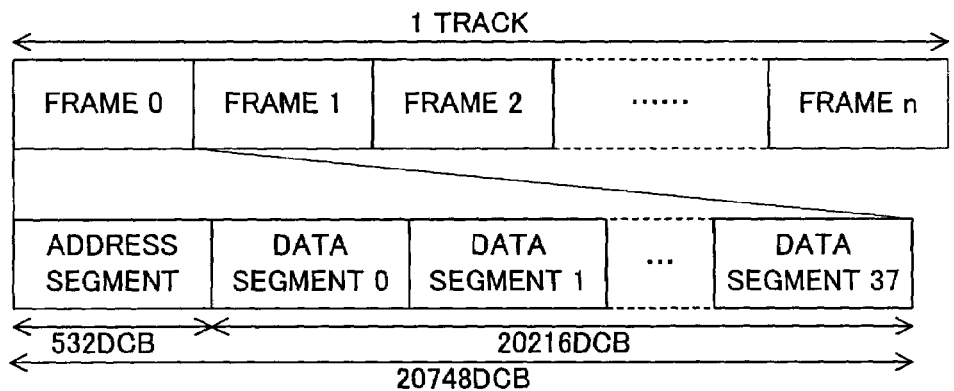
FIG. 2 is an illustrative view showing one example of structure of one track of data recorded in a magnetooptical disk.

As shown in FIG. 2, one track is formed of a plurality of frames, and each frame is formed of one address segment, and 38 of data segments. One frame is 20748 DCB (Data Channel Bit), out of which 532 DCB are assigned to the address segment, and the remaining 20216 DCB are assigned to the data segments 0–37.

Figure 3:
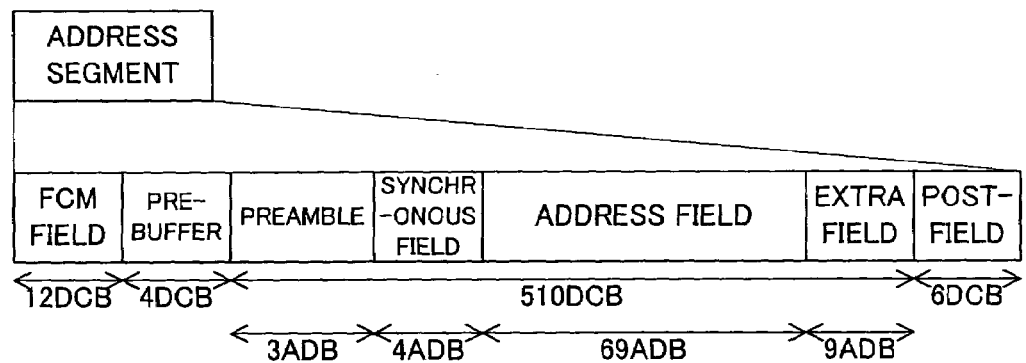
FIG. 3 is an illustrative view showing one example of data structure of an address segment.

As shown in FIG. 3, the address segment is formed of an FCM field, a pre-buffer, preamble 1, a synchronous field, an address field, an extra field, and a post-buffer. 12 DCB are assigned to the FCM field, 4 DCB are assigned to the pre-buffer, and 6 DCB are assigned to the post-buffer. In addition, 510 DCB are assigned to the preamble 1, the synchronous field, the address field, and the extra field. More specifically, 3 ADB (Address Data Bit) are assigned to the preamble 1, 4 ADB are assigned to the synchronous field, 69 ADB are assigned to the address field, and 9 ADB are assigned to the extra field. It is noted 1 DCB is equal to (=) 6 ADB.

Figure 4:
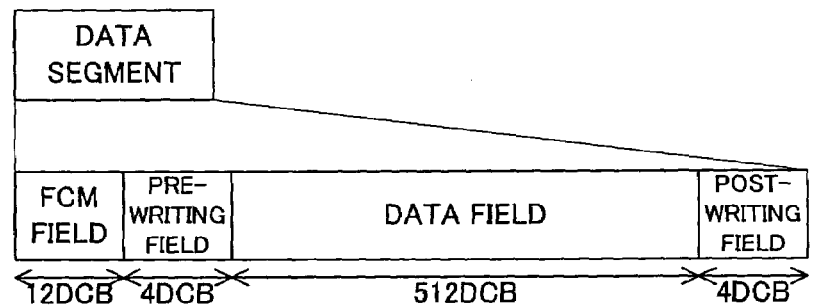
FIG. 4 is an illustrative view showing one example of data structure of a data segment.

As shown in FIG. 4, the data segment is formed of an FCM field, a pre-writing field, a data field, and a post-writing field. 12 DCB are assigned to the FCM field, 4 DCB are assigned to the pre-writing field, 512 DCB are assigned to the data field, and 4 DCB are assigned to the post-writing field.

Figure 5:
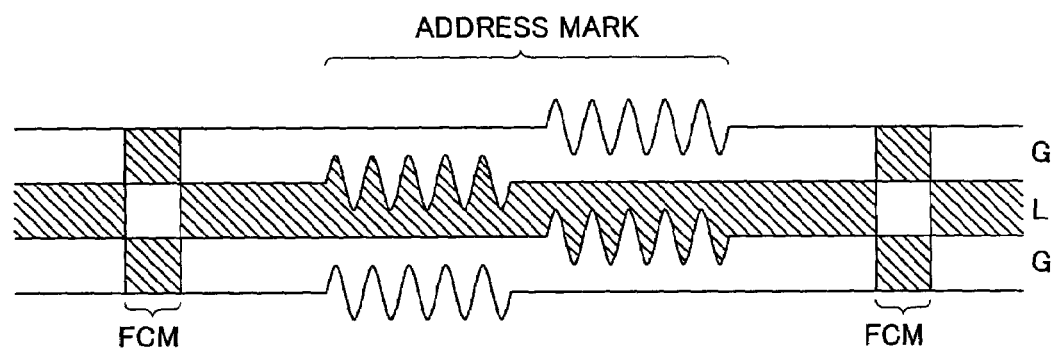
FIG. 5 is an illustrative view showing a shape of a track of a portion in which the address segment is recorded.
Figure 6:
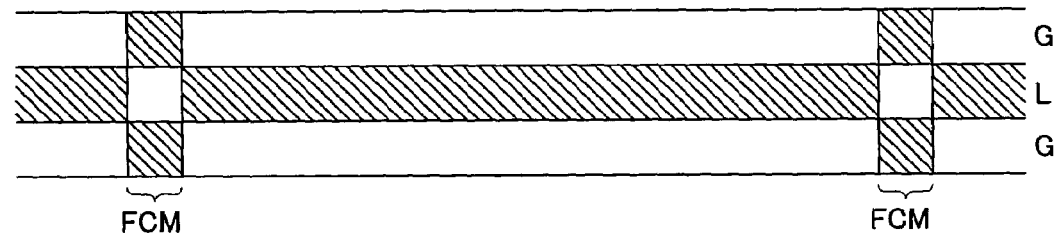
FIG. 6 is an illustrative view showing a shape of a track of a portion in which the data segment is recorded.

On the recording surface of the magnetooptical disk 60, as shown in FIG. 5, and FIG. 6, a land track of a convex shape (L), and a groove track of a concave shape (G) are alternately formed. FIG. 5 shows a shape of the address segment, and FIG. 6 shows a shape of the data segment. As described above, since the FCM field is provided in each of the address segment, and the data segment, the FCM is formed in an embossed manner at a head of the segment in FIG. 5, and FIG. 6, respectively. On the other hand, since the address field is provided in the address segment only, an address mark is illustrated in FIG. 5 only. The FCM on the land track is formed in a concave shape, and the FCM on the groove track is formed in a convex shape. On the other hand, the address mark is formed in an embossed manner in a wobble shape in such a manner as to stride over a border line of the land track and the groove track.

Returning to FIG. 1, the laser beam reflected from the recording surface is transmitted through the optical lens 25, and then radiated onto a light detector 26, and an output of the light detector 26 is input into an FE signal detection circuit 28, and a TE signal detection circuit 30. The FE signal detection circuit 28, and the TE signal detection circuit 30 respectively detect an FE (Focus Error) signal, and a TE (Tracking Error) signal based on the output of the light detector 26. The detected FE signal and the TE signal are applied to a DSP (Digital Signal Processor) 32.

The DSP 32 executes a focus servo process based on the FE signal so as to generate a focus actuator control signal. A generated focus actuator control signal is applied to a focus actuator 18, thereby controlling a position of the optical lens 14 on an optical axis. In addition, the DSP 32 executes a tracking servo process based on the TE signal so as to generate a tracking actuator control signal, and a sled control signal. A generated tracking actuator control signal, and a sled control signal are applied to a tracking actuator 16, and a sled motor 44, respectively. This controls a position of the optical lens 14 in a radius direction (radius direction of the magnetooptical disk 60).

Figure 7:
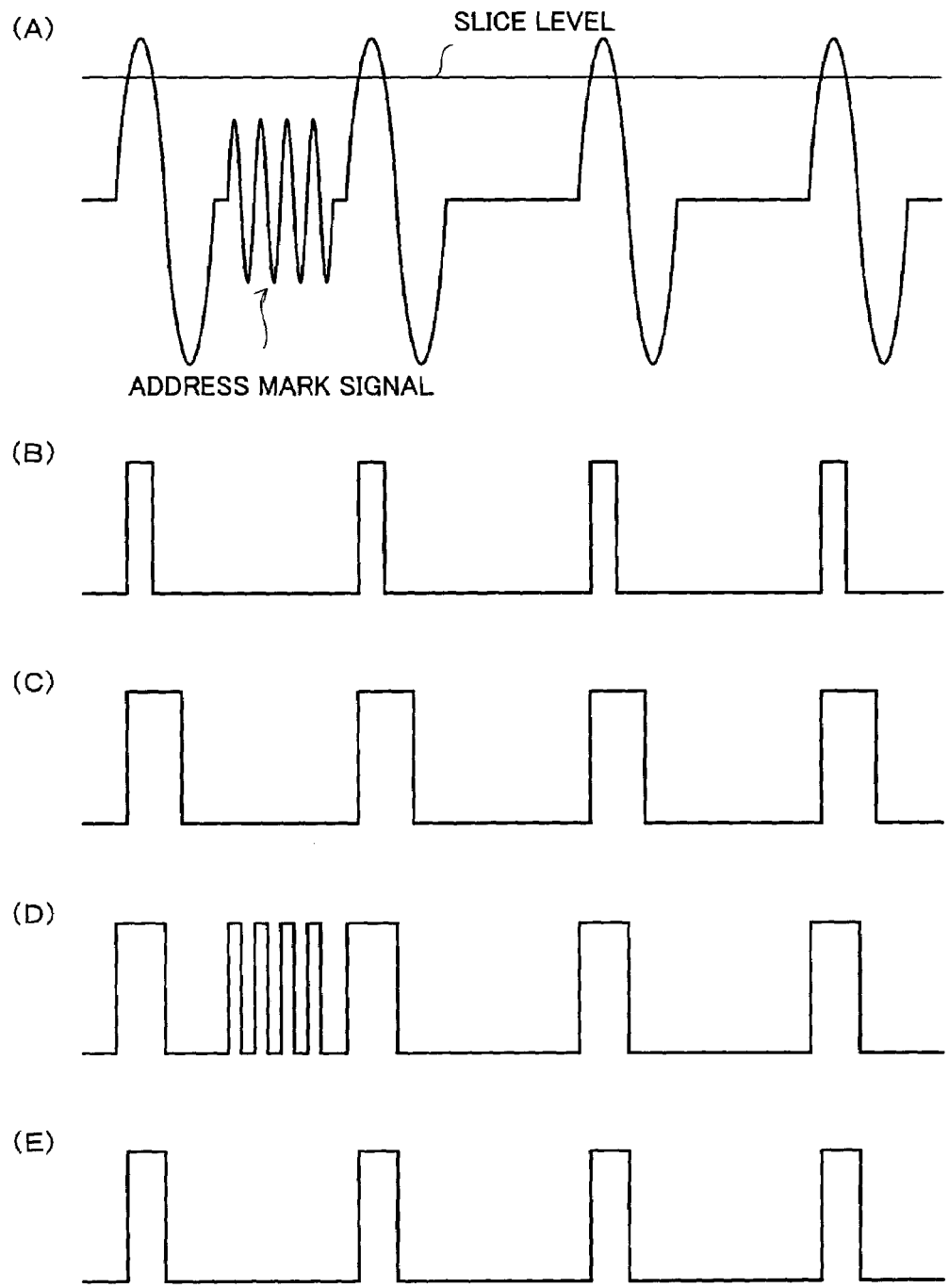
FIG. 7(A) is a waveform chart showing an FCM signal detected from a land track.
FIG. 7(B) is a waveform chart showing an output of a comparator of one side.
FIG. 7(C) is a waveform showing a gate signal.
FIG. 7(D) is a waveform chart showing an output of the comparator of the other side.
FIG. 7(E) is a waveform chart showing an output of an AND gate.
Figure 8:
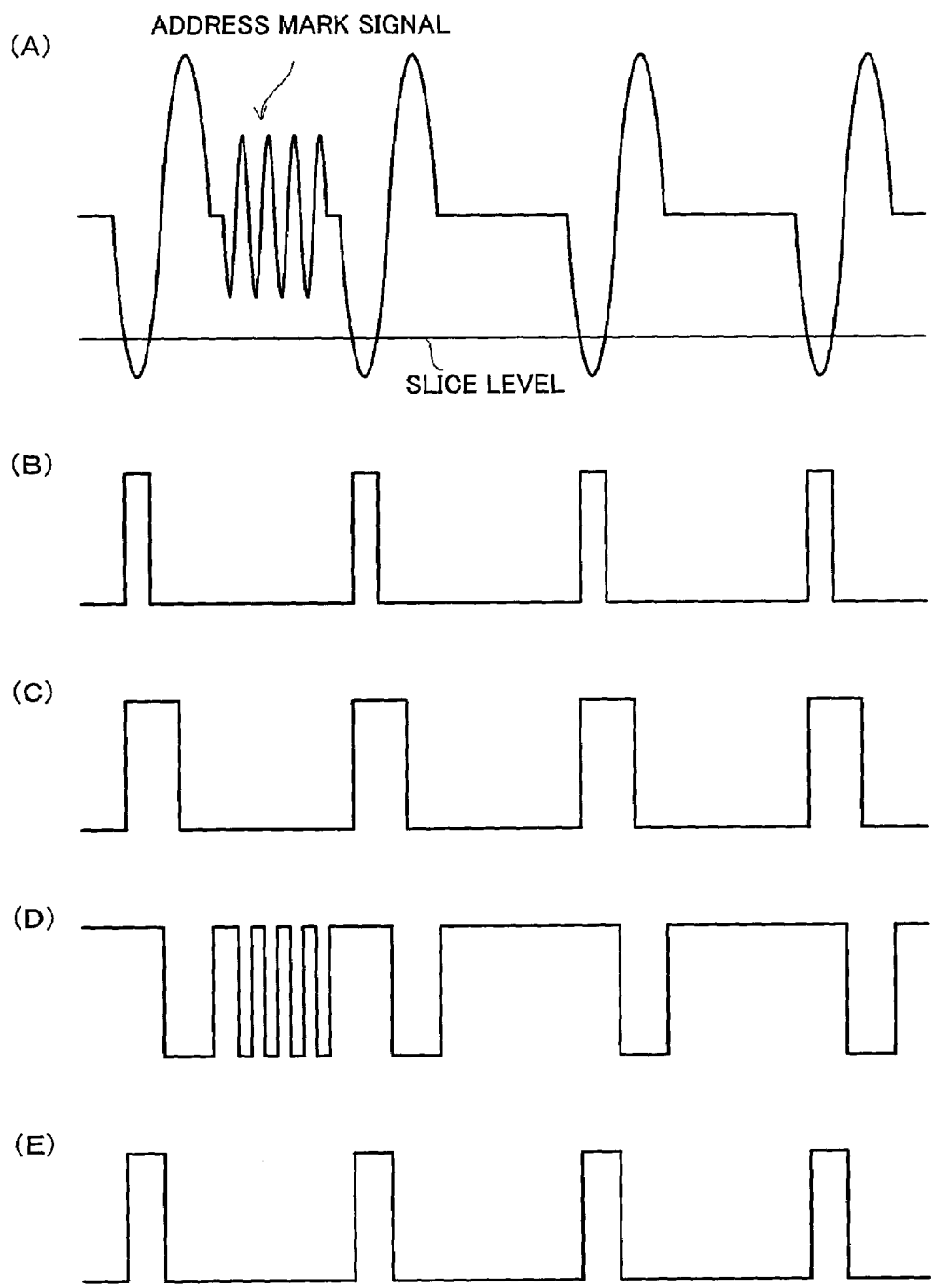
FIG. 8(A) is a waveform chart showing an FCM signal detected from a groove track.
FIG. 8(B) is a waveform chart showing an output of the comparator of one side.
FIG. 8(C) is a waveform chart showing a gate signal.
FIG. 8(D) is a waveform chart showing an output of the comparator of the other side.
FIG. 8(E) is a waveform chart showing an output of the AND gate.

The output of the light detector 26 is also input to an FCM signal detection circuit 36. The FCM signal detection circuit 36, based on the reflected light from the FCM formed on the magnetooptical disk 60, detects an FCM signal. The FCM signal changes as shown in FIG. 7(A) when the laser beam traces the land track, and changes as shown in FIG. 8(B) when the laser beam traces the groove track. According to FIG. 7(A), a level of the FCM signal firstly changes toward a plus side than a median level (zero level), and subsequently changes toward a minus side than the median level. On the other hand, according to FIG. 7(B), the level of the FCM signal firstly changes toward the minus side than the median level, and subsequently changes toward the plus side than the median level. It is noted that when the laser beam traces the address segment, the address mark signal leaks in, and this gives rise to a noise of the FCM signal.

The detected FCM signal is applied to a peak hold circuit 38, a bottom hold circuit 40, and a plus terminal of a comparator 42. The peak hold circuit 38 detects a peak level of the FCM signal, and the bottom hold circuit 40 detects a bottom level (peak level on the minus side than the median level) of the FCM signal. The DSP 32, when the laser beam traces the land track, determines a slice level based on a peak level value, and when the laser beam traces the groove track, determines the slice level based on a bottom level value. The determined slice level is applied to a minus terminal of the comparator 42.

The slice level is set to a level shown in FIG. 7(A) when the laser beam traces the land track, and to a level shown in FIG. 8(A) when the laser beam traces the groove track. The comparator 42 renders the output a high-level when the level of the FCM signal exceeds the slice level, and the output a low-level when the level of the FCM signal falls below the slice level. A comparison signal output from the comparator 42 is directly applied to one terminal of a switch SW1, and to the other terminal of the switch SW1 via an inverter 44.

The DSP 32 connects the switch SW1 to the comparator 42 side when the laser beam traces the land track, and the switch SW1 to the inverter 44 side when the laser beam traces the groove track. This, when the laser beam traces either track, allows the output of the switch SW1 to become a high-level when an absolute value of the level of the FCM signal exceeds the absolute value of the slice level. That is, the output of the switch SW1 changes as shown in FIG. 7(B) or FIG. 8(B).

A gate signal generating circuit 46 generates a gate signal based on the output signal of the switch SW1. The gate signal rises at the same time that the output signal rises, and falls after a predetermined time period passes. The predetermined time period is ½ of a period of the FCM signal, for example. Thereby a timing that the level of the FCM signal crosses the median level is included in a rising time period of the gate signal.

The FCM signal output from the FCM detection circuit 36 is also applied to a plus terminal of the comparator 48. A minus terminal of the comparator 48 is connected to a reference voltage point, which is equal to the median level of the FCM signal. This renders the output of the comparator 48 a high-level when the level of the FCM signal exceeds the median level, and a low-level when the level of the FCM signal is equal to or falls below the median level. The comparison signal output from the comparator 48 is, similar to the above, directly applied to one terminal of a switch SW2, and to the other terminal of the switch SW2 via the inverter 50. The switch SW2 is connected to the comparator 48 side when the laser beam traces the land track, and to the inverter 50 side when the laser beam traces the groove track.

This renders, when the laser beam traces the land track, the output of the switch SW2 a high-level when the FCM signal exceeds the median level, and when the laser beam traces the groove track, the output of the switch SW2 a high-level when the FCM signal is equal to or falls below the median level. That is, the output of the switch SW2, when the laser beam traces the land track, changes as shown in FIG. 7(D), and when the laser beam traces the groove track, changes as shown in FIG. 8(D). As understood from FIG. 7(D) and FIG. 8(D), the output signal of the switch SW2 falls at a timing that the level of the FCM signal crosses the median level.

An AND gate 52 subjects the gate signal, and the output signal of the switch SW2 to an AND operation process. This allows an AND operation signal output from the AND gate 52 to be changed as shown in FIG. 7(E) when the laser beam traces the land track, and changed as shown in FIG. 8(E) when the laser beam traces the groove track. As described above, at a timing that the level of the FCM signal crosses the median level, the gate signal shows the high-level. This allows the AND operation signal to fall in synchronous with a falling of the output signal of the switch SW2. That is, the timing that the level of the FCM signal crosses the median level is extracted by the AND gate 52.

A PLL circuit 54 carries out a PLL (Phase Lock Loop) control using a falling timing of the AND operation signal output from the AND gate 52 as a reference, and generates a clock signal that rises at every 1 DCB. The clock signal output from the PLL circuit 54 is applied to the DSP 32, and an ECC decoder 58. The DSP 32 controls a rotation speed of the spindle motor 64 based on the clock signal. On the other hand, the ECC decoder 58, in response to the clock signal, decodes an RF signal detected by an RF signal detection circuit 56 at a time of reproducing.

An optimum reproduction laser power, and an optimum recording laser power change depending on a circumferential temperature of the optical pick-up 12, and an optimum slice level capable of appropriately slicing the FCM signal also changes depending on the circumferential temperature of the optical pick-up 12. Due to this, the DSP 32 firstly determines two reproduction-use reference slice levels, and two recording-use reference slice levels according to flowcharts shown in FIG. 9–FIG. 11, and furthermore, calculates the optimum reproduction laser power and the optimum recording laser power, and the reproduction-use optimum slice level and the recording-use optimum slice level according to a flowchart shown in FIG. 12 at every predetermined period (every five minutes, for example).

Figure 9:
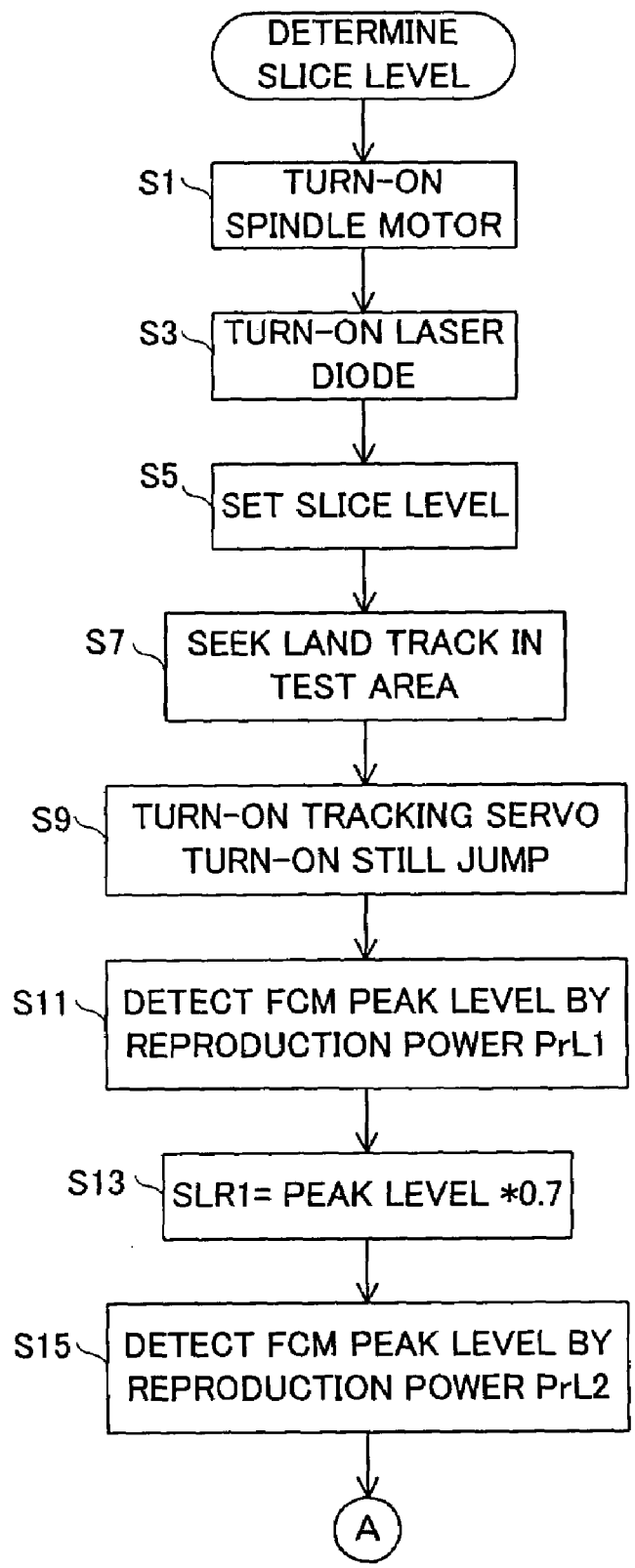
FIG. 9 is a flowchart showing one portion of a processing operation of a DSP.
Figure 10:
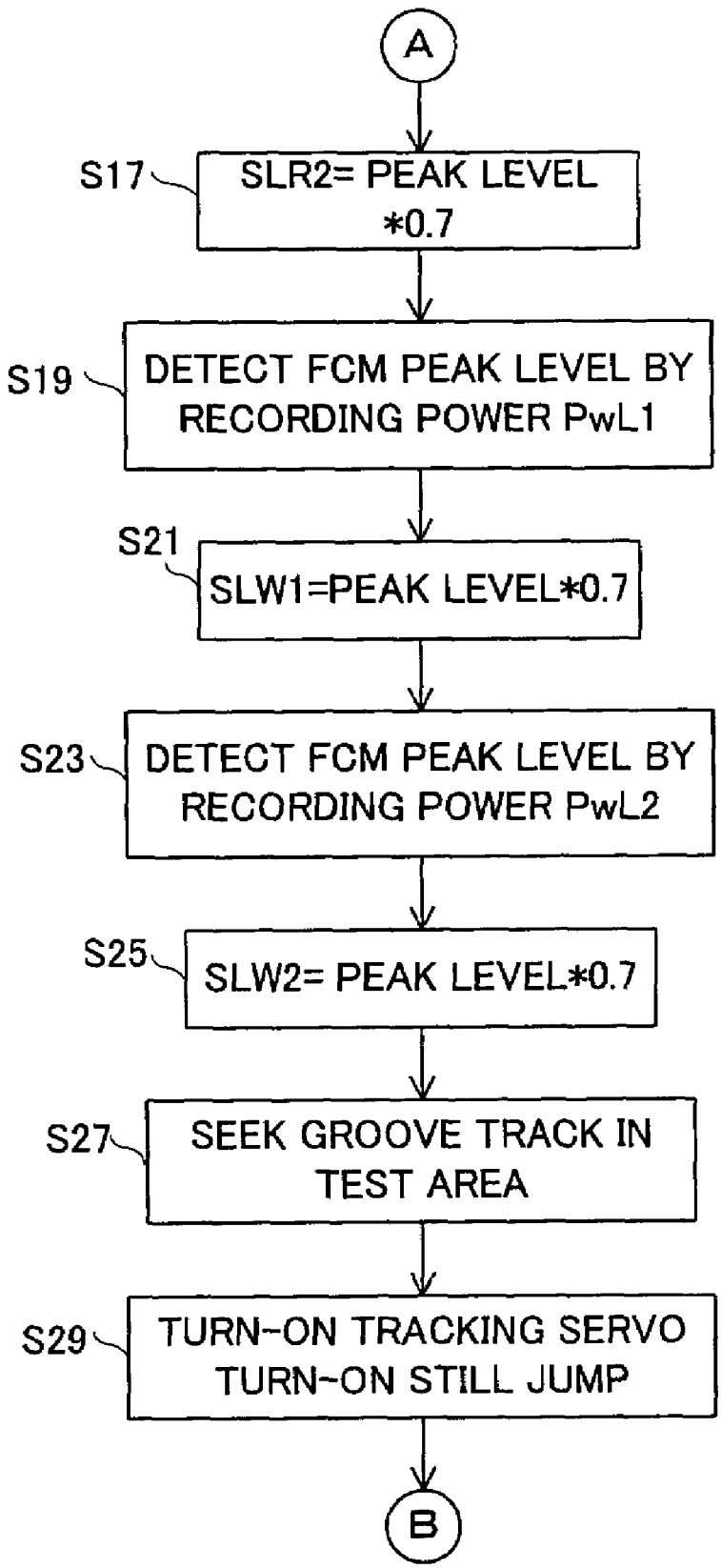
FIG. 10 is a flowchart showing another portion of the processing operation of the DSP.
Figure 11:
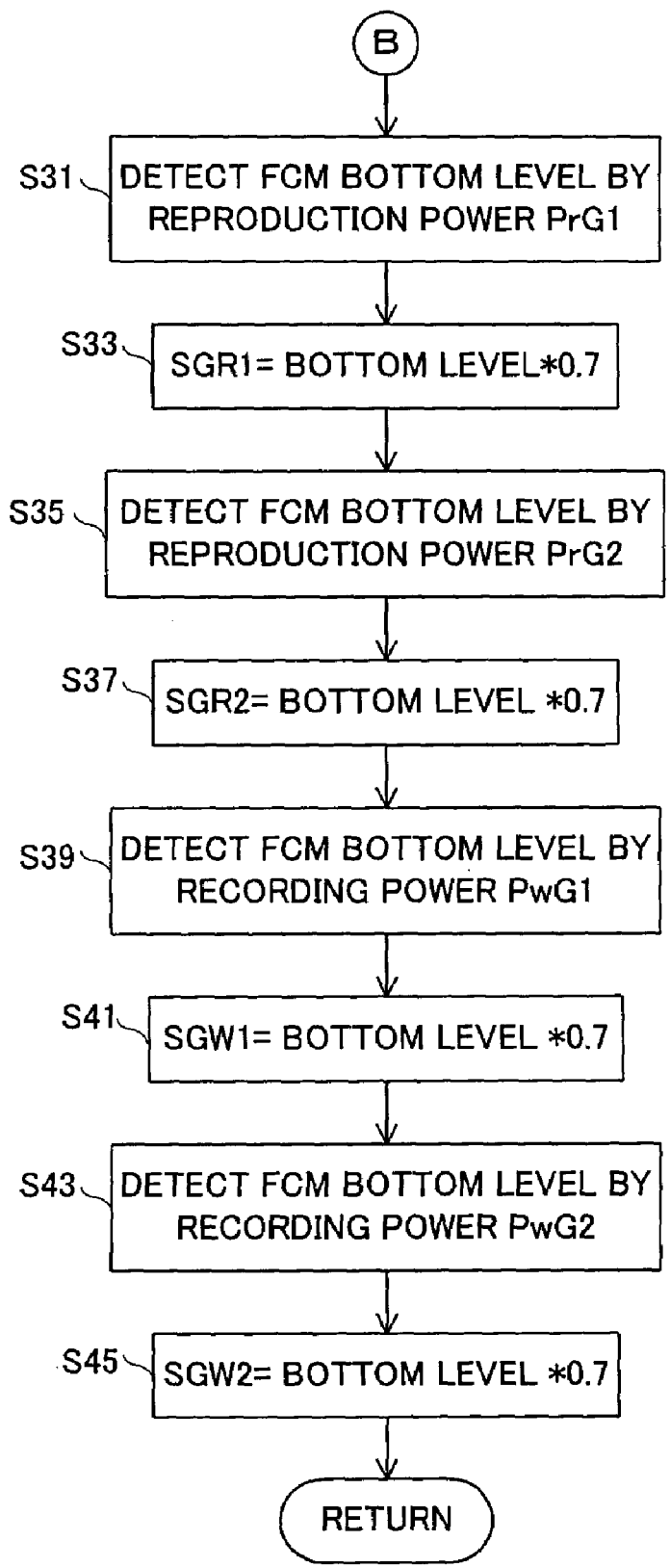
FIG. 11 is a flowchart showing the other portion of the processing operation of the DSP.

Referring to FIG. 9–FIG. 11, firstly, the spindle motor 64 is started in a step S1, and a default reproduction laser power is set to the laser diode 20 in a step S3. Thereby, the laser beam is radiated from the laser diode 20, the FCM signal is detected based on the laser beam reflected from the recording surface, and the peak level value and the bottom level value of the detected FCM signal are applied to the DSP 32. The slice level is determined based on the input peak level value or bottom level value in a step S5. The land track in a test area formed on the magnetooptical disk 60 is sought in a step S7. Upon completion of the process in the step S7, a tracking servo and a still jump are started in a step S9. The laser beam traces the land track, and returns to an old land track at every time that the disk makes one rotation. This prevents a radiating destination of the laser beam from being deviated from the test area.

In a step S11, a reproduction laser power PrL1 is set to the laser diode 20, and the peak level value of the FCM signal detected at this time is fetched from the peak hold circuit 38. In a step S13, an operation according to an equation 1 is subjected to the fetched peak level value so as to evaluate a slice level SLR1 corresponding to the reproduction laser power PrL1.

$$SLR1 = \text{peak level} * 0.7 \qquad \text{[Equation 1]}$$

In a step S15, the peak level value of the FCM signal corresponding to the reproduction laser power PrL2 is detected as in the step S11, and in a step S17, an operation according to an equation 2 is subjected to the detected peak level value so as to evaluate the slice level SLR2 corresponding to the reproduction laser power PrL2.

$$SLR = \text{peak level value} * 0.7 \qquad \text{[Equation 2]}$$

Also in a step S19, the peak level value of the FCM signal corresponding to the recording laser power PwL1 is detected as in the step S11, and in a subsequent step S21, an operation according to an equation 3 is subjected to the detected peak level value so as to evaluate the slice level SLW1 corresponding to the recording laser power PwL1.

$$SLW1 = \text{peak level value} * 0.7 \qquad \text{[Equation 3]}$$

Also in a step S23 once again, the peak level value of the FCM signal corresponding to the recording laser power PwL2 is detected as in the step S11, and in a step S25, an operation according to an equation 4 is subjected to the detected peak level value so as to evaluate the slice level SLW2 corresponding to the recording laser power PwL2.

$$SLW2 = \text{peak level value} * 0.7 \qquad \text{[Equation 4]}$$

Thus, two reproduction-use reference slice levels SLR1 and SLR2 in the land track, and two recording-use reference slice levels SLW1 and SLW2 in the land track are obtained.

Upon completion of the step S25, a groove track in the test area is sought in a step S27, and the tracking servo and the still jump are started in a step S29. Thereby, the laser beam traces the groove track, and the radiating destination of the laser beam returns to the old groove track after the disk makes one rotation.

In a step S31, a reproduction laser power PrG1 is set to the laser diode 20, and the bottom level value of the FCM signal detected at this time is fetched from the button hold circuit 40. In a step S13, an operation according to an equation 5 is subjected to the fetched bottom level value so as to evaluate a slice level SGR1 corresponding to the reproduction laser power PrG1.

$$SGR1 = \text{bottom level value} * 0.7 \qquad \text{[Equation 5]}$$

In a step S35, the bottom level value of the FCM signal corresponding to a reproduction laser power PrG2 is detected as in the step S31, and in a step S37, an operation according to an equation 6 is subjected to the detected bottom level value so as to evaluate the slice level SGR2 corresponding to the reproduction laser power PrG2.

$$SRG2 = \text{bottom level value} * 0.7 \qquad \text{[Equation 6]}$$

Also in a step S39, the bottom level value of the FCM signal corresponding to a recording laser power PwG1 is detected as in the step S31, and in a subsequent step S41, an operation according to an equation 7 is subjected to the detected bottom level value so as to evaluate the slice level SWG1 corresponding to the recording laser power PwG1.

$$SGW1 = \text{peak level value} * 0.7 \qquad [\text{Equation 7}]$$

Still also in a step S43, the bottom level value of the FCM signal corresponding to a recording laser power PwG2 is detected as in the step S31, and in a step S45, an operation according to an equation 8 is subjected to the detected bottom level value so as to evaluate the slice level SGW2 corresponding to the recording laser power PwG2.

$$SGW2 = \text{peak level value} * 0.7 \qquad [\text{Equation 8}]$$

Thus, the two reproduction-use reference slice levels SGR1 and SGR2 in the groove track, and the two recording-use reference slice levels SWG1 and SGW2 in the groove track are obtained.

Figure 12:
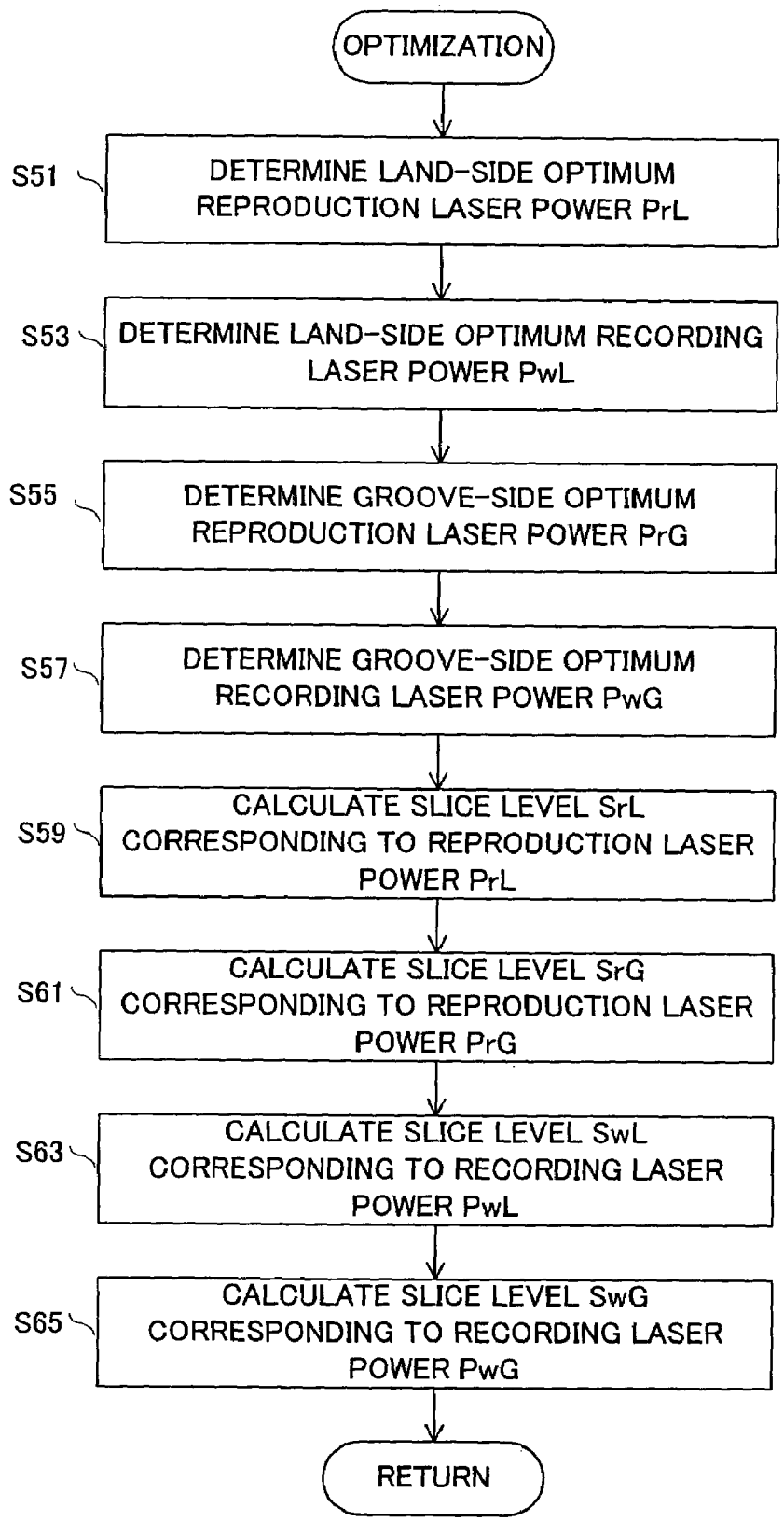
FIG. 12 is a flowchart showing a further portion of the processing operation of the DSP.

A flowchart shown in FIG. 12 is, as described above, executed at every predetermined period in view of a change of the circumferential temperature of the optical pick-up 12. Firstly, in respective steps S51–S57, a land-side optimum reproduction laser power PrL, a land-side optimum recording laser power PwL, a groove-side optimum reproduction laser power PrG, and a groove-side optimum reproduction laser power PwG are determined. Since these determination processes are disclosed in Japanese Patent Application No. 2000-269838 filed in Sep. 6, 2000 by the applicant, detailed descriptions are omitted.

Upon completion of the step S57, a slice level SrL corresponding to the land-side optimum reproduction laser power PrL is calculated according to an equation 9 in a step S59, a slice level SrG corresponding to the groove-side optimum reproduction laser power PrG is calculated according to an equation 10 in a step S61, a slice level SwL corresponding to the land-side optimum recording laser power PwL is calculated according to an equation 11 in a step S63, and a slice level SwG corresponding to the groove-side optimum recording laser power PwG is calculated according to an equation 12 in a step S65.

$$SrL = \{(SLR1 - SLR2) * PrL + SLR2 * PrL1 - SLR1 * PrL2\} / (PrL1 - PrL2) \qquad [\text{Equation 9}]$$

$$SrG = \{(SGR1 - SGR2) * PrG + SGR2 * PrG1 - SGR1 * PrG2\} / (PrG1 - PrG2) \qquad [\text{Equation 10}]$$

$$SwL = \{(SLW1 - SLW2) * PrW + SLW2 * PwL1 - SLW1 * PwL2\} / (PwL1 - PwL2) \qquad [\text{Equation 11}]$$

$$SwG = \{(SWG1 - SGW2) * PwG + SGW2 * PwG1 - SGW1 * PwG2\} / (PwG1 - PwG2) \qquad [\text{Equation 12}]$$

A relationship between the laser power set to the laser diode 20, and the peak level of the FCM signal (i.e., slice level) is expressed by a linear function. However, the process toward the laser diode is different depending on a time of the recording, and a time of the reproduction (pulse modulation and high-frequency superimposition) so that the linear function is different depending on the recording, and the reproduction. Furthermore, the linear functions are different to each other depending on a case of radiating the laser beam onto the land track, and a case of radiating the laser beam onto the groove track.

Due to this, the reference slice levels SLR1 and SLR2 corresponding to the land track-use reproduction laser power PrL1 and PrL2 are evaluated, the reference slice levels SLW1 and SLW2 corresponding to the land track-use recording laser power PwL1 and PrL2 are evaluated, the reference slice levels SGR1 and SGR2 corresponding to the groove track-use reproduction laser power PrG1 and PrG2 are evaluated, and the reference slice levels SGW1 and SGW2 corresponding to the groove track-use recording laser power PwG1 and PwG2 are evaluated.

Figure 13:
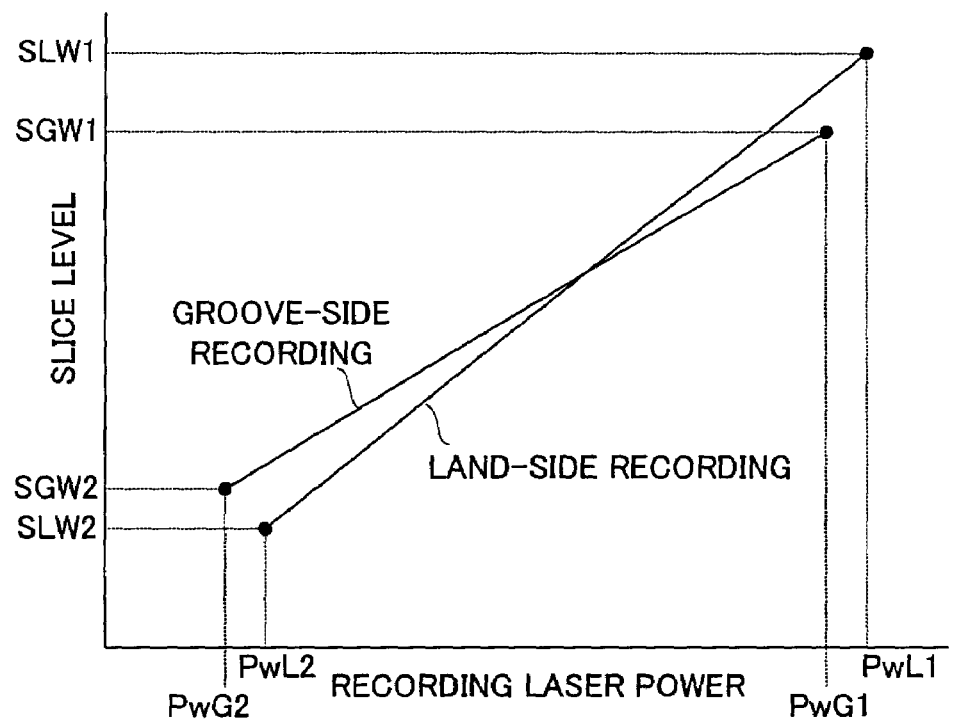
FIG. 13 is a graph showing a relationship between a recording laser power and a slice level.
Figure 14:
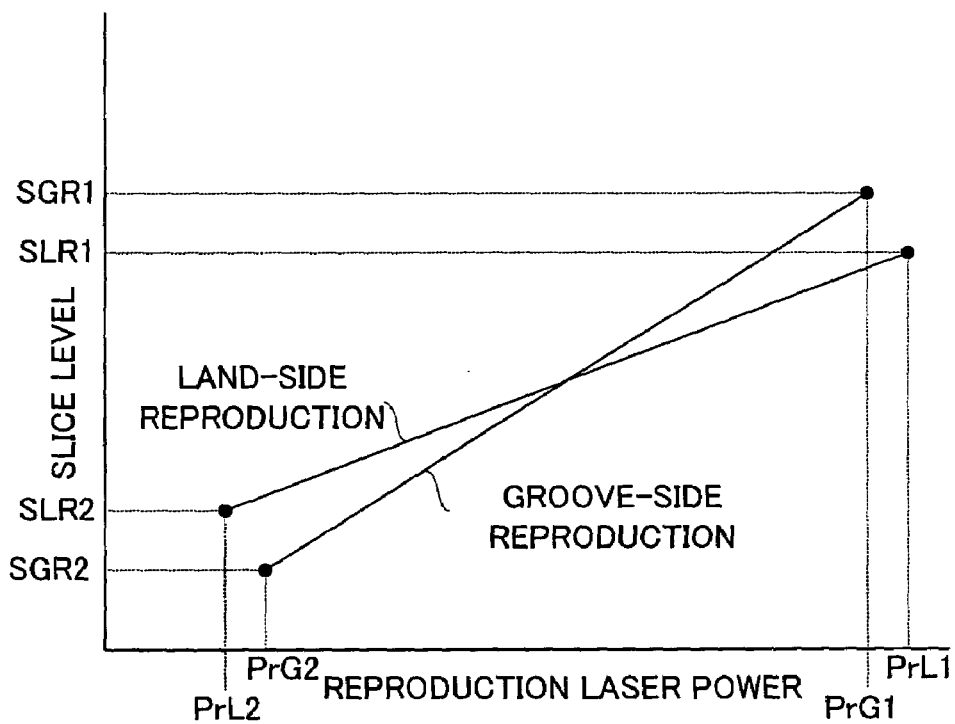
FIG. 14 is a graph showing a relationship between a reproducing laser power and a slice level.

Thereby, two linear functions shown in FIG. 13 are established regarding the recording, and two linear functions shown in FIG. 14 are established regarding the reproduction. In steps S59–S65, the slice levels are calculated based on such the linear functions, and the laser power determined in the steps S51–S57.

Figure 15:
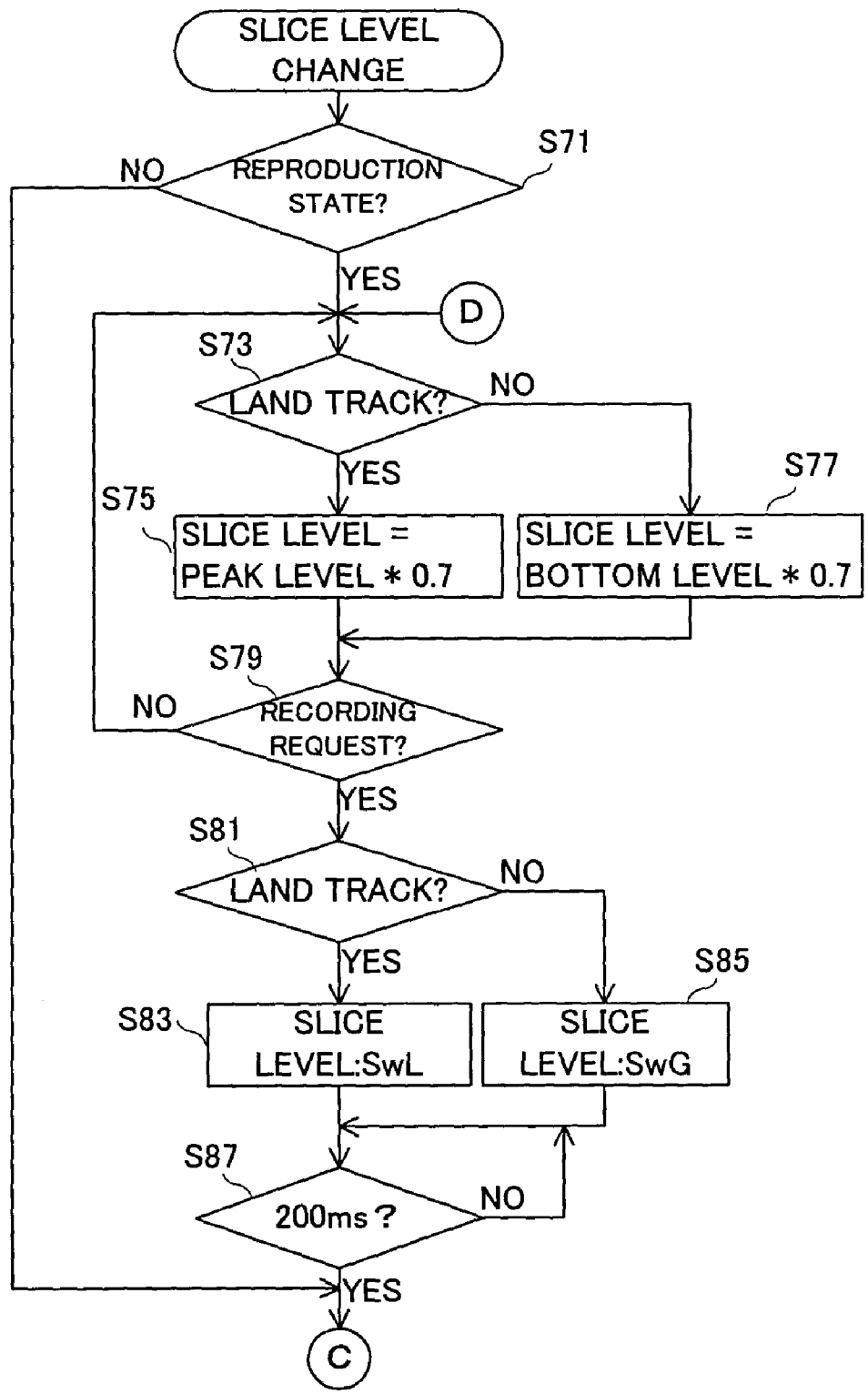
FIG. 15 is a flowchart showing still another example of the processing operation of the DSP.
Figure 16:
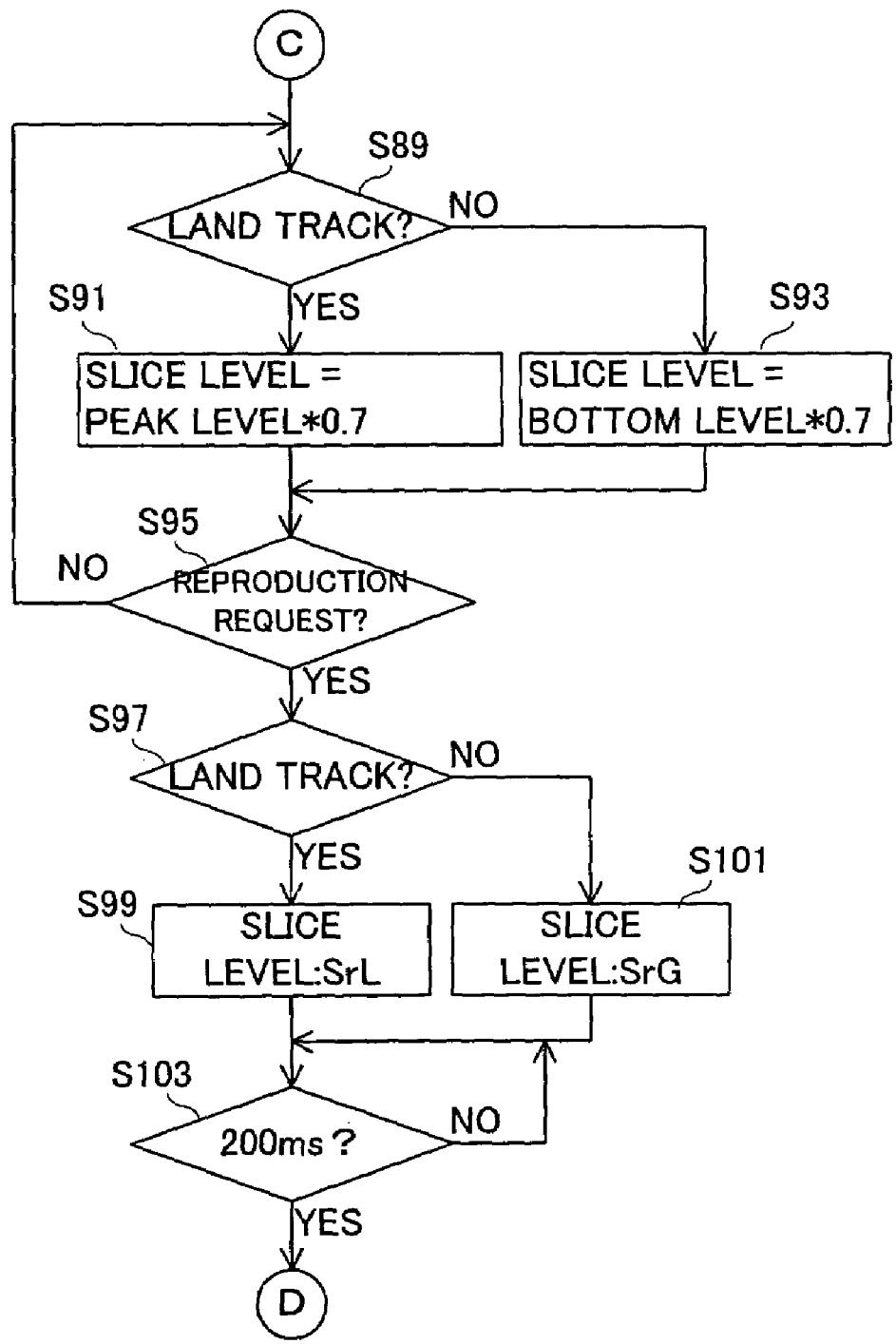
FIG. 16 is a flowchart showing another example of the processing operation of the DSP.

The DSP 32, when changing the slice level applied to the comparator 42, carries out flowcharts shown in FIG. 15 and FIG. 16. Firstly, a present operating state is determined in a step S71. Herein, if the operating state is "recording", processes of steps S89–S103 are carried out. However, if the operating state is "reproducing", processes of steps S71–S87 are carried out. As described above, the signal output from the ECC encoder 22 is intermittently recorded in the vacant area sporadically formed on the recording surface so that, even during a time that the signal of a desired size is recorded, an execution/interruption of the recording process is frequently repeated. However, since it is necessary that the FE signal, the TE signal, and the FCM signal are detected for a seek process even during a time that the recording is interrupted, the same signal process as the reproducing process except that the reproduction signal is not output is carried out during a time that the recording is interrupted. Thus, the process in the step S71 is a determination process of the execution/interruption of the recording process, and a different process is carried out depending on a determination result.

When advancing to the step S73, it is determined whether the radiating destination of the laser beam is the land track or the groove track. If the radiating destination is the land track, the peak level value is fetched from the peak hold circuit 38 in the step S75, and a level value of 70% of the peak level value is rendered the slice level, and then, set to the comparator 42. On the other hand, if the radiating destination is the groove track, the bottom level value is fetched from the bottom hold circuit 38 in the step S77, and 70% of the fetched bottom level value is rendered the slice level, and then, set to the comparator 42.

In the step S79, it is determined whether or not a recording request (recording execution request) occurs. The recording request is issued when the radiating destination of the laser beam reaches a desired recording address. Herein, if NO, the process returns to the step S73. However, if YES, the process advances to the step S81 so as to determine the radiating destination of the laser beam. Then, if the radiating destination is the land track, the slice level SwL is set to the comparator 42 in the step S83, and if the radiating destination is the groove track, set to the slice level SwG in the step S85. It is determined whether or not 200 mili seconds has passed since the recording request is issued in the step S87, and if YES is determined, the process advances to the step S89.

In the step S89, the radiating destination of the laser beam is determined. If the radiating destination is the land track, the process advances to the step S91, and if the radiating destination is the groove track, the process advances to the step S93. In the step S91, the peak level value of the FCM signal is fetched from the peak hold circuit 38, and 70% of the FCM signal is set to the comparator 42. In the step S93, the bottom level value of the FCM signal is fetched from the peak hold circuit 40, and 70% of the fetched bottom level value is set to the comparator 42.

Upon completion of the processes of step S91 or S93, the process advances to the step S95 so as to determine whether or not a reproduction request (recording interruption request) is issued. Herein, if NO, the process returns to the step S89. However, if YES, the radiating destination of the laser beam is determined in the step S97. If the radiating destination is the land track, the slice level SrL is set to the comparator 42 in the step S99, and if the radiating destination is the groove track, the slice level SrG is set to the comparator 42 in the step S101. In the step S103, it is determined whether or not 200 mili seconds has passed since the reproduction request is issued, and if the resultant determination is YES, the process returns to the step S73.

It is noted that a change of operations not associated with the slice level such as a connection of the switch SW1, the laser power set to the laser diode 20, and etc., is executed according to a routine not shown.

As a result of such the slice level change being performed, the slice level SwL or SwG calculated in the above-described step S63 or S65 is rendered valid during a period of 200 mili seconds since the recording request is issued, and after 200 mili seconds pass, the slice level associated with the peak level or the bottom level of the FCM signal is rendered valid. In addition, during a time of 200 mili seconds since the reproduction request is issued, the slice level SrL or SrG calculated in the above-described step S59 or S61 is rendered valid, and after 200 mili seconds pass, the slice level associated with the peak level or the bottom level of the FCM signal is rendered valid.

Figure 17:
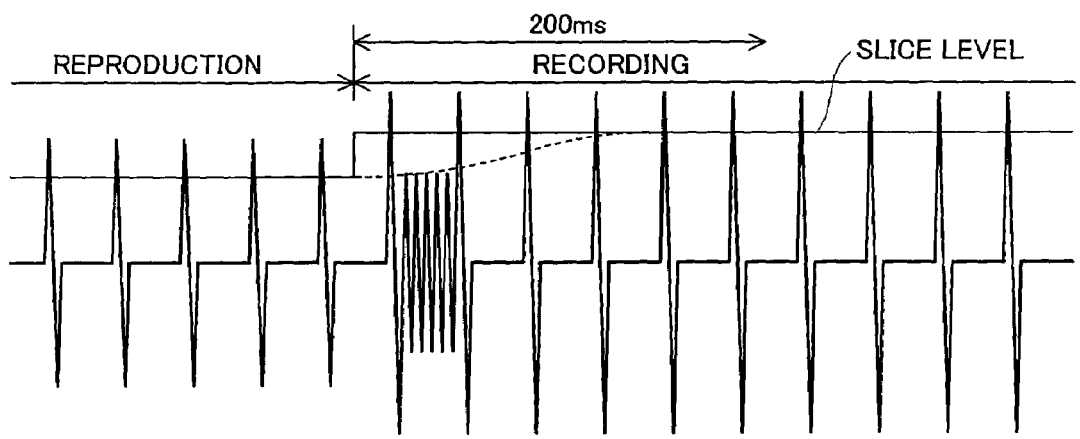
FIG. 17 is a waveform chart showing a change of the FCM signal and the slice level when changed from a reproduction to a recording in a state that a laser beam traces a land track.
Figure 18:
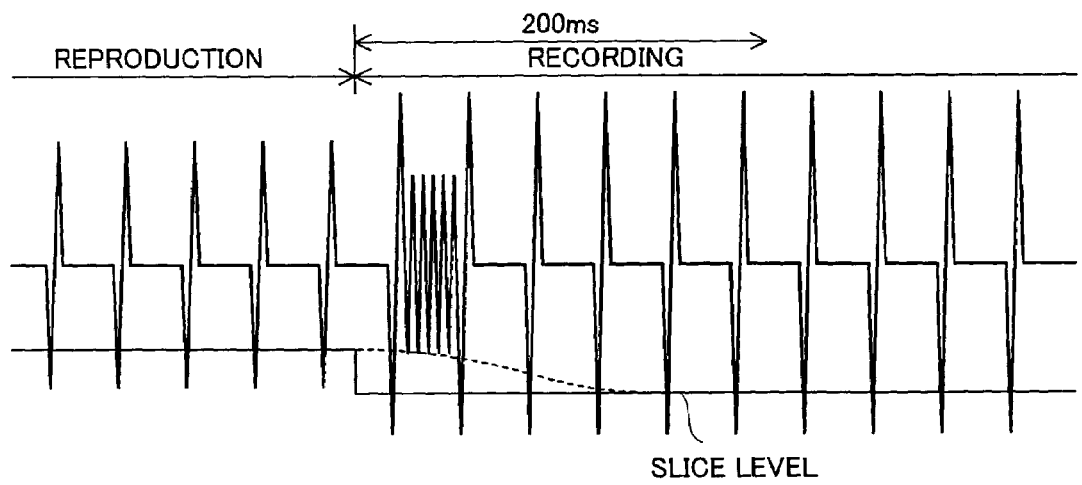
FIG. 18 is a waveform chart showing a change of the FCM signal and the slice level when changed from the reproduction to the recording in a state that the laser beam traces a groove track.
Figure 19:
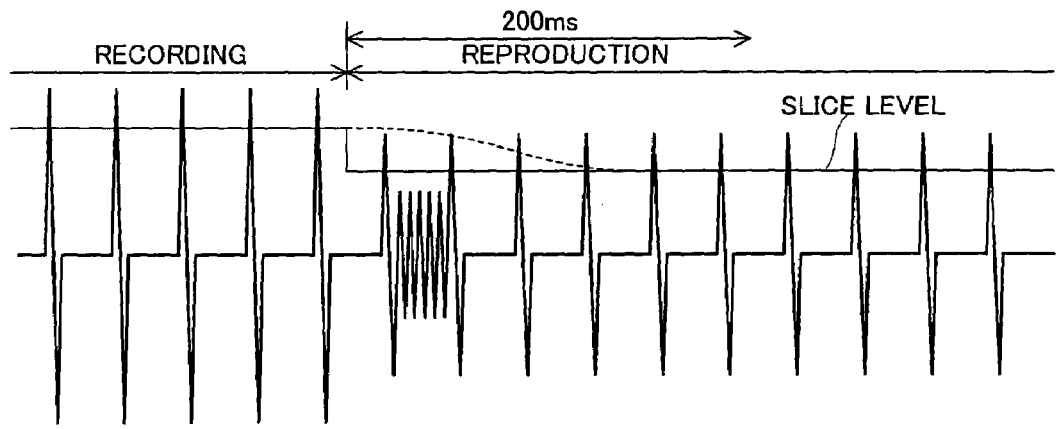
FIG. 19 is a waveform chart showing a change of the FCM signal and the slice level when changed from the recording to the reproduction in a state that the laser beam traces the land track.
Figure 20:
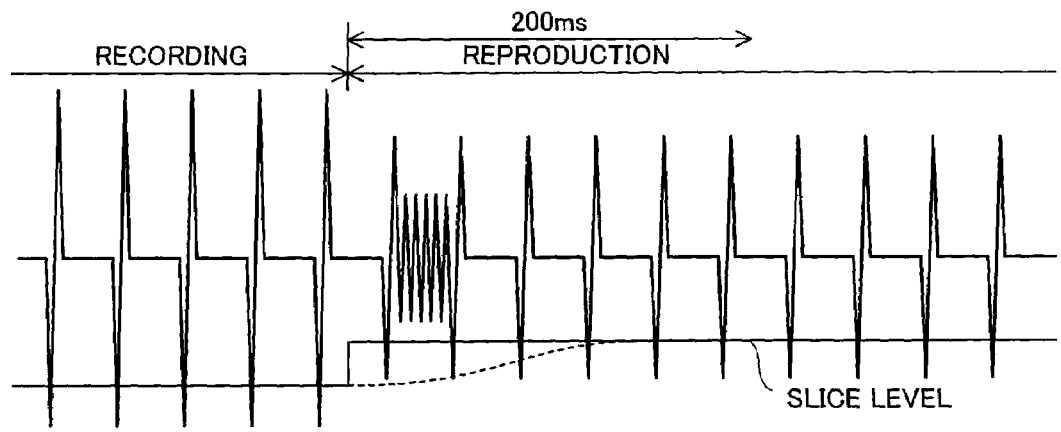
FIG. 20 is a waveform chart showing a change of the FCM signal and the slice level when changed from the recording to the reproduction in a state that the laser beam traces the groove track.
Figure 21A:
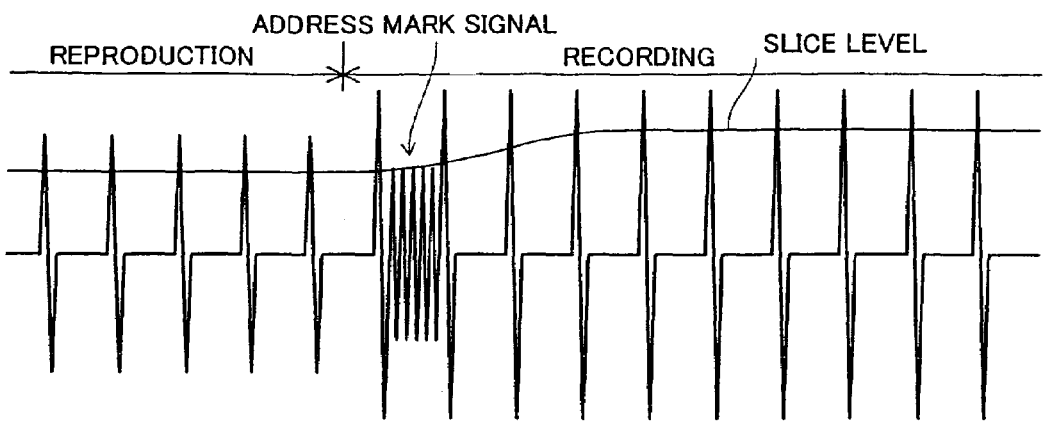
FIG. 21(A) is a waveform chart showing one example of a change of the FCM signal and the slice level when changed from the reproduction to the recording in the prior art.
Figure 21B:
FIG. 21(B) is a waveform chart showing one example of a comparison signal.
Figure 22A:
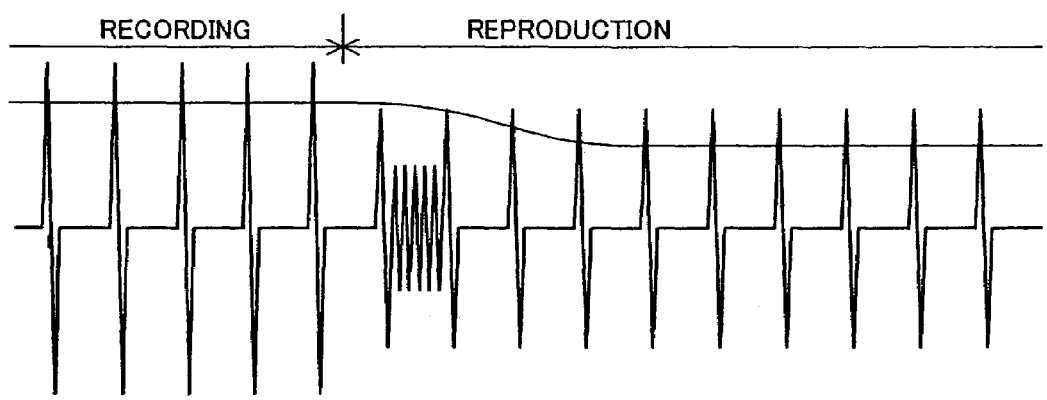
FIG. 22(A) is a waveform chart showing one example of a change of the FCM signal and the slice level when changed from the recording to the reproduction in the prior art.
Figure 22B:
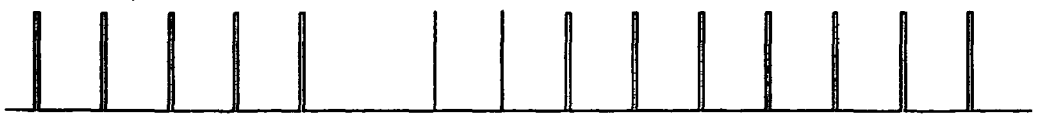
FIG. 22(B) is a waveform chart showing one example of the comparison signal.

Even during a time that one of the land track and the groove track is traced, when the reproduction (recording interruption) is changed to the recording (recording execution), an amplitude of the FCM signal is increased at the same time of the change from the reproduction the recording as shown in FIG. 17 or FIG. 18. On the other hand, when the recording is changed to the reproduction, the amplitude of the FCM signal is decrease at the same time of a change from the recording to the reproduction as shown in FIG. 19 or FIG. 20. At a time of such the change between the recording/reproduction, a change speed of the output of the peak hold circuit 38 and the bottom hold circuit 40 depends on a time constant. When the time constant is large, the slice level based on the peak level or the bottom level gradually changes as indicated by a dotted line in FIG. 17–FIG. 20. Due to this, if the slice level is to be determined based on the peak level or the bottom level of the FCM signal at a time of the change between the recording/reproduction, a noise is included in the output of the comparator 42 or a portion of the output is lacked, which disturbs a period and a phase of the clock signal.

In view of such the problem, the slice level previously calculated based on the reference slice level is to be set to the comparator 42 during a predetermined time period since the change between the recording/reproduction in this embodiment. This allows the slice level to be promptly changed at the same time of the change between the recording/reproduction, thereby preventing the above-described noise from being occurred, and a portion of the signal from being lacked. As a result, the period and the phase of the clock signal is not disturbed even at a time of the change between the recording/reproduction.

It is noted that in this embodiment, the two reference slice levels are specified regarding each of the recording/reproduction toward the land track and the groove track, and the slice level to be set to the comparator 42 is to be calculated based thereon at a time of the change between the recording/reproduction. However, there is a case in which the linear function shown in FIG. 13 and FIG. 14 intersects with a point of origin. In this case, one reference slice level is specified regarding each of the recording/reproduction toward the land track and the groove track, then it becomes possible to calculate the slice level set to the comparator 42.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disk apparatus which rotates a disk recording medium formed with a first emboss mark along a track in a predetermined period, radiates onto said track a laser beam having a different light amount depending on a time of an execution and an interruption of a recording process, and detects a first emboss mark signal associated with said first emboss mark based on said laser beam reflected from said track, comprising:
   a generating means for generating a clock signal based on a comparison result between a level of said first emboss mark signal and a threshold value;
   a receiving means for receiving a change request between an execution/interruption of said recording process;
   a first determining means for determining a first numeral as said threshold value from a reception of said change request until a passing of a predetermined time period; and
   a second determining means for determining a second numeral associated with a peak level of said first emboss mark signal as said threshold value after said predetermined time period passed.

2. A disk apparatus according to claim 1, further comprising:
   a first detection means for detecting a first peak level of the first emboss mark signal obtained by radiating a laser beam of a first light amount;
   a second detection means for detecting a second peak level of the first emboss mark signal obtained by radiating a laser beam of a second light amount; and
   a calculating means for calculating said first numeral based on said first light amount, said second light amount, said first peak level, said second peak level, and a light amount of said laser beam after receiving said change request.

3. A disk apparatus according to claim 1 or 2, wherein said first emboss mark signal is a signal that changes toward a plus side and a minus side in reference to a median level, and said generating means includes a timing detection means for detecting a timing that a level of said first emboss mark signal moves from one side, which is one of said plus side and said minus side, to the other side, an extracting means for extracting a portion of a timing detection signal output from said timing detection means based on said comparison result, and a producing means for producing said clock signal based on the timing detection signal extracted by said extracting means.

4. A disk apparatus according to claim 3, wherein said extracting means extracts the timing detection signal firstly obtained immediately after a level of said first emboss mark signal moves to said median level side than said threshold value.

5. A disk apparatus according to claim 3 or 4, wherein said disk recording medium is intermittently formed with a second emboss mark along said track.

6. A disk apparatus according to any one of claims 1 to 5, wherein said disk recording medium is sporadically formed with a plurality of vacant areas.

7. A threshold value control method of a disk apparatus which rotates a disk recording medium formed with an emboss mark along a track in a predetermined period, radiates onto said track a laser beam having a different light amount depending on a time of an execution and an interruption of a recording process, detects an emboss mark signal associated with said emboss mark based on said laser beam reflected from said track, and generates a clock signal based on a comparison result between a level of said emboss mark signal and a threshold value, comprising steps of:
 (a) determining a first numeral as said threshold value from a reception of a change request between an execution/interruption of said recording process until a passing of a predetermined time period; and
 (b) determining a second numeral associated with a peak level of said first emboss mark signal as said threshold value after said predetermined time period passed.

8. A threshold value control method according to claim 7, further comprising steps of:
 (c) detecting a first peak level of the emboss mark signal obtained by radiating a laser beam of a first light amount;
 (d) detecting a second peak level of the emboss mark signal obtained by radiating a laser beam of a second light amount, and
 (e) calculating said first numeral based on said first light amount, said second light amount, said first peak level, said second peak level, and a light amount of said laser beam after receiving said change request.

9. A disk apparatus, comprising:
 a rotator for rotating a disk recording medium having a track which extends in a rotating direction and a first emboss mark which is periodically formed along said track;
 an emitter for emitting onto said track a laser beam having a different light amount depending on a time of an execution and an interruption of a recording process;
 a signal detector for detecting a first emboss mark signal associated with said first emboss mark based on the laser beam reflected from said track;
 a generator for generating a clock signal based on a comparison result between a level of the first emboss mark signal detected by said signal detector and a threshold level;
 a receiver for receiving a change request between an execution/interruption of the recording process;
 a first determiner for determining a first level as the threshold level from a reception of the change request until a passing of a predetermined time period; and
 a second determiner for determining a second level as the threshold level after the predetermined time period has passed, wherein the first level is associated with a light amount of the laser beam after a reception of the change request, and the second level is associated with a peak level of the first emboss mark signal.

10. A disk apparatus according to claim 9, further comprising:
 a first level detector for detecting a first peak level of the first emboss mark signal obtained by emitting a laser beam of the first light amount;
 a second level detector for detecting a second peak level of the first emboss mark signal obtained by emitting a laser beam of a second light amount; and
 a calculator for calculating the first level based on the first light amount, the second light amount, the first peak level, the second peak level, and a light amount of the laser bean after receiving the change request.

11. A disk apparatus according to claim 9, wherein the first emboss mark signal is a signal that changes toward each of a plus side and a minus side in reference to a median level and said generator includes a timing detector for detecting a timing that a level of the first emboss mark signal moves from one of the plus side and the minus side to the other of the plus side and the minus side, an extractor for extracting a portion of a timing detection signal output from said timing detector based on the comparison result, and a producer for producing the clock signal based on the timing detection signal extracted by said extractor.

12. A disk apparatus according to claim 11, wherein said extractor extracts the timing detection signal firstly obtained after a level of the first emboss mark signal moves to the median level side than the threshold level.

13. A disk apparatus according to claim 9, wherein said disk recording medium further has a second emboss mark intermittently formed along said track.

* * * * *